US007912746B2

(12) United States Patent
Kline et al.

(10) Patent No.: US 7,912,746 B2
(45) Date of Patent: Mar. 22, 2011

(54) METHOD AND SYSTEM FOR ANALYZING SCHEDULE TRENDS

(75) Inventors: Warren J. Kline, Sachse, TX (US);
Diane M. McCrea, Moshannon, PA (US); Lora J. Clark, Frisco, TX (US); Michael D. Hinman, Thornton, CO (US); Paula D. Pope, Fishertown, PA (US); Darcie H. Rakickas, Aurora, CO (US)

(73) Assignee: Raytheon Company, Waltham, MA (US)

( * ) Notice: Subject to any disclaimer, the term of this patent is extended or adjusted under 35 U.S.C. 154(b) by 1163 days.

(21) Appl. No.: 11/559,801

(22) Filed: Nov. 14, 2006

(65) Prior Publication Data

US 2008/0114625 A1     May 15, 2008

(51) Int. Cl.
*G06F 9/46* (2006.01)
(52) U.S. Cl. .......... 705/8; 705/7; 705/9; 705/11; 700/90
(58) Field of Classification Search ........................ None
See application file for complete search history.

(56) References Cited

U.S. PATENT DOCUMENTS

| 5,381,332 | A | * | 1/1995 | Wood | 705/8 |
| 5,406,476 | A | * | 4/1995 | Deziel et al. | 705/8 |
| 5,907,490 | A | * | 5/1999 | Oliver | 700/90 |
| 6,167,320 | A | * | 12/2000 | Powell | 700/95 |
| 6,609,100 | B2 | * | 8/2003 | Smith et al. | 705/8 |
| 6,738,682 | B1 | | 5/2004 | Pasadyn | |
| 6,873,961 | B1 | * | 3/2005 | Thorpe et al. | 705/7 |
| 2002/0082889 | A1 | * | 6/2002 | Oliver | 705/8 |
| 2002/0099590 | A1 | * | 7/2002 | Abate et al. | 705/10 |
| 2003/0229618 | A1 | * | 12/2003 | Judy | 707/1 |
| 2004/0148212 | A1 | * | 7/2004 | Wu et al. | 705/8 |
| 2008/0082388 | A1 | * | 4/2008 | Fishman | 705/8 |

OTHER PUBLICATIONS

"The Impact of Processing Time Variability on a Synchronous Assembly Line" (Steven J. Erlebacher; Medini R. Singh; Department of Industrial and Operations Engineering, The University of Michigan Ann Arbor, MI 48 109-2 117 Technical Report 92-55 Oct. 1992 Revised Jul. 1993).*
"Optimal Variance Structures and Performance Improvement of Synchronous Assembly Lines" Steven J. Erlebacher and Medini R. Singh; Operations Research, vol. 47, No. 4 (Jul.-Aug. 1999), pp. 601-618.*
PCT Notification of Transmittal of the International Search Report and the Written Opinion of the International Searching Authority, or the Declaration, mailed Sep. 23, 2008, in re PCT/US 07/83275 filed Nov. 1, 2007 (12 pages).

* cited by examiner

*Primary Examiner* — Lynda C Jasmin
*Assistant Examiner* — Alan Miller
(74) *Attorney, Agent, or Firm* — Baker Botts L.L.P.

(57) ABSTRACT

A method for determining a variance trend in schedule data includes retrieving schedule data comprising a task description of a task and a plurality of milestones associated with the task including a baseline milestone associated with a baseline deadline, a first updated milestone associated with a first updated deadline, and a second updated milestone associated with a second updated deadline. The method further includes calculating a first variance by comparing the first updated deadline to the baseline deadline, calculating a second variance by comparing the second updated deadline to the baseline deadline, automatically determining the variance trend in schedule data by comparing the first variance to the second variance, and automatically generating a display representing the variance trend.

12 Claims, 7 Drawing Sheets

Customized File For Trend Analysis

*Current Project File Custom Field Definitions*

| Field | Value |
|---|---|
| Start First Period Ago Field | Start8: St 1 Pd Ago |
| Start Second Period Ago Field | Start9: St 2 Pd Ago |
| Start Third Period Ago Field | Start10: St 3 Pd Ago |
| Start Slips Count Field | Duration4: Start Slips |
| Finish First Period Ago Field | Finish1: Fin 1 Pd Ago |
| Finish Second Period Ago Field | Finish2: Fin 2 Pd Ago |
| Finish Third Period Ago Field | Finish3: Fin 3 Pd Ago |
| Finish Slips Count Field | Duration5: Finish Slips |
| Finish Variance Trend Field | Number19: FV Trend |
| Finish Variance Indicator Field | Number20: Finish Var |
| Previous Finish Variance Field | Duration9: Prev FV |
| Tier 1 (MOR) Milestone Field | Flag9: Tier 1 MS |
| Unique Identification Field | Unique ID |
| First Textfield for Filtering Reports | Text11: EV CN % |
| Second Textfield for Filtering Reports | Text18: LOE |
| Cumulative Critical Path Field | Flag13: Cum CP |

Cancel     Ok

METHOD AND SYSTEM FOR ANALYZING SCHEDULE TRENDS

TECHNICAL FIELD

This invention relates generally to scheduling systems and more specifically to a method and system for analyzing schedule trends.

BACKGROUND

A project manager organizes and handles project tasks to meet the overall objectives of the project. The project manager uses a schedule to define deadlines for project tasks and to track the progress of project tasks. During a project, schedule changes may occur. In this instance, the project manager may manually track schedule changes to evaluate the effect of the changes on project objectives. In some cases, the project manager may use this evaluation to make changes to the schedule.

SUMMARY OF THE DISCLOSURE

In accordance with the present invention, disadvantages and problems associated with previous techniques for analyzing schedule trends may be reduced or eliminated.

In one embodiment, a method for determining a variance trend in schedule data is provided. The method retrieves schedule data from a database. The schedule data comprises a task description of a task and a plurality of milestones associated with the task. The milestones comprise a baseline milestone associated with a baseline deadline, a first updated milestone associated with a first updated deadline, and a second updated milestone associated with a second updated deadline. The method calculates a first variance by comparing the first updated deadline to the baseline deadline and a second variance by comparing the second updated deadline to the baseline deadline. The method automatically determines the variance trend in schedule data by comparing the first variance to the second variance. The method automatically generates a display representing the variance trend.

In one embodiment, a method for analyzing a trend in a cumulative number of tasks is provided. The method retrieves one or more task descriptions from a database. Each task description is associated with a task. The method determines a cumulative baseline number of tasks planned for completion between a first time and a time value. The method also determines a cumulative updated number of tasks updated for completion between the first time and a time value. The method also automatically compares the cumulative baseline number to the cumulative updated number and automatically generates a display comparing the cumulative baseline number to the cumulative updated number.

Certain embodiments of the invention may provide one or more technical advantages. A technical advantage of one embodiment may be that the analysis of schedule trends to evaluate project performance can be automated. The automated analysis may provide improved warning of slipping deadlines, which may allow a project manager to take mitigating measures to keep the project on schedule. Another technical advantage of one embodiment may be that the generation of charts and other displays of trend data can be automated. A project manager may, for example, be able to automatically generate a trend chart in a presentation software.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
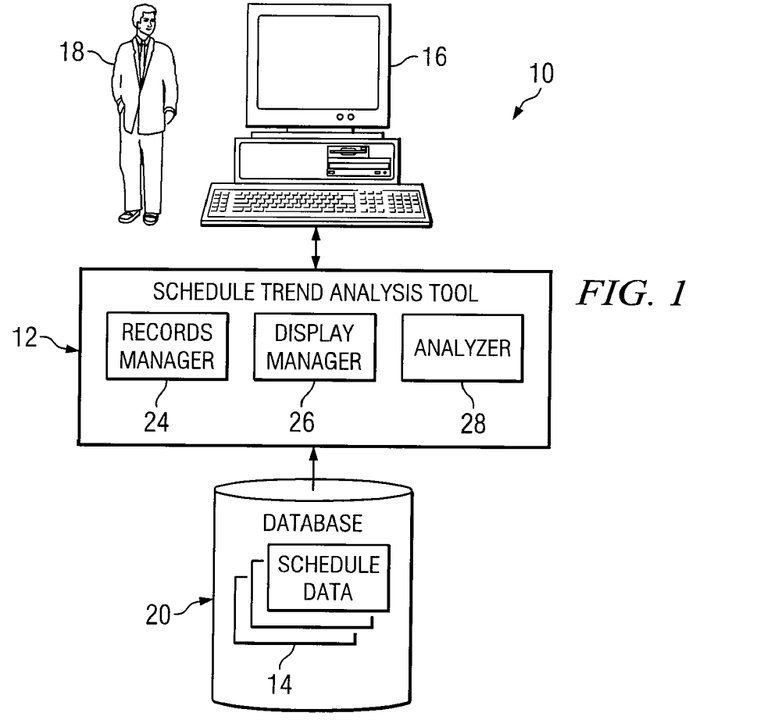
FIG. 1 is a block diagram of a system for analyzing trends in schedule data to evaluate project performance and project planning in accordance with one embodiment of the invention.

FIG. 1 is a block diagram of a system 10 for analyzing trends in schedule data to evaluate project performance and project planning in accordance with one embodiment of the invention. Some functions performed by embodiments of system 10 may be automated. For example, system 10 may automatically determine trends in slipped deadlines. System 10 may also automatically generate displays of trend data, such as schedule trend charts.

User 18 may be any suitable user of system 10. For example, user 18 may be a project manager. A project may be a program of project tasks planned to achieve a particular goal. A project task may refer to an action or operation of a project. Examples of project tasks may include a work assignment, a meeting, a management review, a receipt of goods, and a delivery of a product.

Project timelines may be used to represent the chronological sequence of project tasks. Timelines may start at the beginning of a project and end at the completion of the project. Project timelines may be used to organize project tasks. In one embodiment, a schedule may associate project tasks with times along the timeline. For example, a project task may start at a start time and end at an end time. A time period may refer to a time interval between a start time and an end time. A schedule may associate start and end times to the times of the timeline.

A schedule may associate tasks to project timelines. In one embodiment, a schedule associates tasks to project timelines using milestones. A milestone may refer to a task associated with a time that the task is to occur. A milestone may associate a task with times along a project timeline. For example, a milestone may indicate the predicted end time of a work assignment. In another example, a milestone may indicate the predicted start time of a work assignment. In yet another example, a milestone may indicate the delivery of a product by a delivery date.

Different types of milestones may be used to schedule tasks. Types of milestones may include baseline milestones, updated milestones, and actual milestones. Baseline milestones are predicted before or at the beginning of a project. Updated milestones are milestones that are predicted after the beginning of the project. In some embodiments, an updated milestone may refer to an updated baseline milestone. In one example, an updated milestone may indicate changes to the completion time of the task. Actual milestones may indicate the completion of a task.

Cumulative milestones may refer to the total number of milestones over a time period. Types of cumulative milestones may include cumulative baseline milestones, cumulative updated milestones, and cumulative actual milestones. Cumulative baseline milestones may be the total number of baseline milestones predicted to occur during a time period. Cumulative updated milestones may be the total number of updated milestones predicted to occur during a time period. Cumulative actual milestones may be the total number of actual milestones completed during a time period.

Cumulative milestones may be used to determine the accuracy of the predicted times for completing tasks. For example, the cumulative number of actual milestones may be compared with the cumulative number of baseline milestones. If the number of baseline milestones is greater than the number of actual milestones, the baseline milestones predictions may be determined to be inaccurate.

The cumulative number of tasks may be the total number of tasks scheduled to occur or actually completed during a time period. Types of cumulative numbers may include the cumulative baseline number of tasks, cumulative updated number of tasks, and cumulative actual number of tasks. The cumulative baseline number of tasks may be the total number of tasks predicted before or at the beginning of the project to occur during a time period. The cumulative updated number of tasks may be the total number of tasks predicted after the beginning of the project to occur during a time period. The cumulative actual number of tasks may be the total number of tasks completed during a time period.

Variances may indicate deviations from the original planned schedule. A variance is the measure of a deviation from the original planned schedule. In some embodiments, variance may measure the time change between a baseline milestone and an updated milestone. In other embodiments, variance may measure the time change between an actual completed milestone and a baseline milestone. In one embodiment, variance may measure the time change between the predicted start time of a task and the actual start time of the task.

Variances may indicate that a task is behind, on, or ahead of schedule. A positive variance may indicate that a deadline for a task has slipped and that the task is behind schedule. In some embodiments, a deadline may include a start time and/or an end time of a project task. A negative variance may indicate that the task is ahead of schedule. A zero variance may indicate that the task is on schedule.

A variance trend may measure the change in variances from one time period to another time period. Variance trends may measure the accuracy of the milestone predictions. For example, a positive variance trend may indicate that deadline associated with updated milestones are approaching deadlines associated with baseline milestones. In this example, the deadlines associated with the baseline milestones may be a good prediction of the actual deadlines.

Schedules may include tasks descriptions and milestones. A task description may explain the scope and purpose of a task. For example, a task description may be a title summarizing the scope of the task. A task description may be in any suitable form. For example, a task description may be a pictorial representation such as an icon. In another example, a task description may be a written title of a task. Schedules may be stored as schedule data 14 in database 20.

According to the illustrated embodiment, system 10 includes a schedule trend analysis tool 12, a graphical user interface (GUI) 16, and a database 20. Schedule trend analysis tool 12 includes a records manager 24, an analyzer 28, and a display manager 26 in the illustrated embodiment. In one embodiment of operation, records manager 24 retrieves schedule data 14 from database 20 and communicates schedule data 14 to analyzer 28. Analyzer 28 analyzes the schedule data 14 and communicates the analyzed schedule data 14 to display manager 26. Display manager 26 communicates the analyzed schedule data to GUI 16 for display to user 18.

According to the embodiment, records manager 24 may include a processor and/or software for retrieving schedule data 14 from database 20. In some embodiments, records manager may retrieve schedule data from database 20. Database 20 may include any hardware, software, firmware, or combination of the preceding for storing and facilitating retrieval of schedule data. Also, database 20 may use any of a variety of data structures, arrangements, and compilations to store and facilitate retrieval of schedule data. In the illustrated embodiment, database 20 stores schedule data 14 and/or analyzed schedule data 14.

Analyzer 28 may include a processor and/or software for analyzing schedule data according to the illustrated embodiment. In some embodiments, analyzer 28 may determine variances and variance trends. In other embodiments, analyzer 28 may calculate cumulative baseline milestones, cumulative updated milestones, and cumulative actual milestones for a plurality of time periods. In other embodiments, analyzer 28 may calculate the number of tasks predicted to occur during a plurality of time periods. For example, analyzer 28 may calculate the total number of tasks predicted to occur during the stages of a project.

Display manager 26 may include a processor and/or software for communicating analyzed schedule data on GUI 16 to user 18. Display manager 26 may operate to represent analyzed schedule data in any form on GUI 16. For example, display manager 26 may represent the analyzed schedule data in tabular or graphical form.

GUI 16 may be software, hardware, or any combination thereof that is operable to receive input for system 10, send output from system 10, or any combination of the preceding. In one example, GUI 16 may be a Microsoft Project interface. In the illustrated embodiment, GUI 16 receives input from user 18 and communicates output to user 18. GUI 16 may communicate output to user 18 in any suitable form. In one example, GUI 16 may display output on a screen. In another example, GUI 16 may provide output in printed form.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of records manager 24 and display manager 26 may be performed by one module, or the operations of records manager 24 may be performed by more than one module. Additionally, operations of system 10 may be performed using any suitable logic comprising software, hardware, other logic, or any suitable combination of the preceding.

Figure 2:
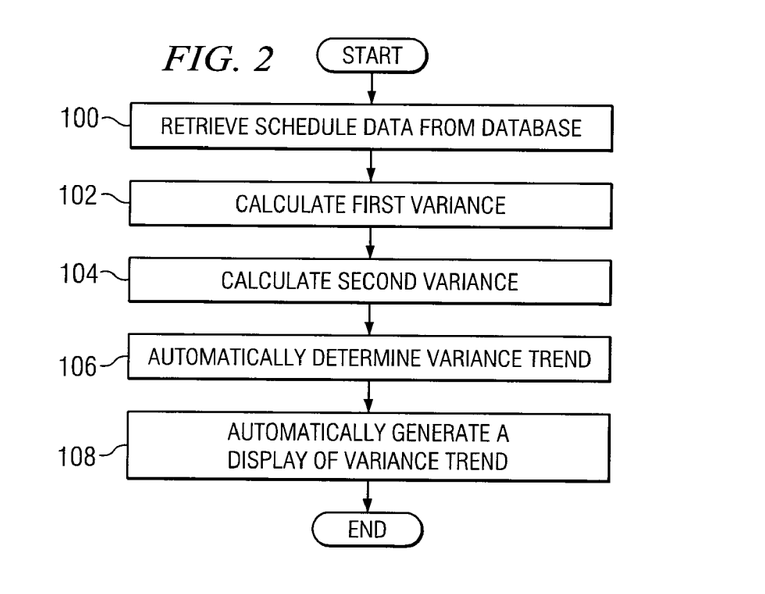
FIG. 2 is a flowchart describing a method for analyzing variance trends in schedule data in accordance with one embodiment of the invention.

FIG. 2 is a flowchart describing a method for analyzing variance trends in schedule data in accordance with some embodiments of the invention. In the illustrated embodiment, analyzer 28 calculates variance trends of schedule data 14 retrieved from database 20.

At step 100, schedule data 14 is retrieved from database 20. In one embodiment, records manager 24 may retrieve schedule data 14 from database 20.

In some embodiments, baseline milestones may be planned at the beginning of a project. For example, a baseline milestone may be created at the beginning of a project that shows the task is planned for completion in January. After the project begins, such as 10 days later, the baseline milestone may be evaluated to determine whether the baseline milestone prediction is inaccurate. A first updated milestone may be created to move the task end time to a later time, for example, for completion in March. The first updated milestone may be associated with a first time that the first updated milestone was created.

Milestones may be evaluated at any number of times during the project to track the progress of the tasks and to evaluate the accuracy of the schedule planning. In the example, the first updated milestone may be reevaluated 30 days after the project begins. The first updated milestone may be determined to be too conservative. A second updated milestone may be created to show that the task is now planned for completion in February.

At step 102, a first variance is calculated. The first variance may be the time difference between the first updated milestone and the baseline milestone. The first variance is two months, indicating that the task is behind schedule.

At step 104, a second variance is calculated. The second variance may be the time difference between the second updated milestone and the baseline milestone. In the example, the second variance is one month, indicating that the project is behind schedule.

At step 106, a variance trend is automatically determined. The variance trend may be the difference between the first and second variances. In the example, the variance trend is negative one month. This negative variance trend indicates an improvement in predicting the deadlines since the updated milestone is moving progressively towards the planned baseline milestone.

At step 108, a display of the variance trend is automatically generated. In one embodiment, display manager 26 may communicate the variance trend to GUI 16 for display to user 18. Additionally or alternatively, a hard copy of the variance trend may be generated and provided to user 18, and/or the results may be made available as a web publication.

The display may include a tabular or graphical representation of data such as charts, tables, graphs, and/or other figures, to present to user 18 for further analysis of trend data. The display may describe variances, variance trends, indicators, times, timelines, tasks, and/or other scheduling data.

Modifications, additions, or omissions may be made to the method without departing from the scope of the invention. The method may include more, fewer, or other steps. For example, the method may omit calculating the first variance and add retrieving the first variance from the database. Additionally, steps may be performed in any suitable order without departing from the scope of the invention.

Figure 3:
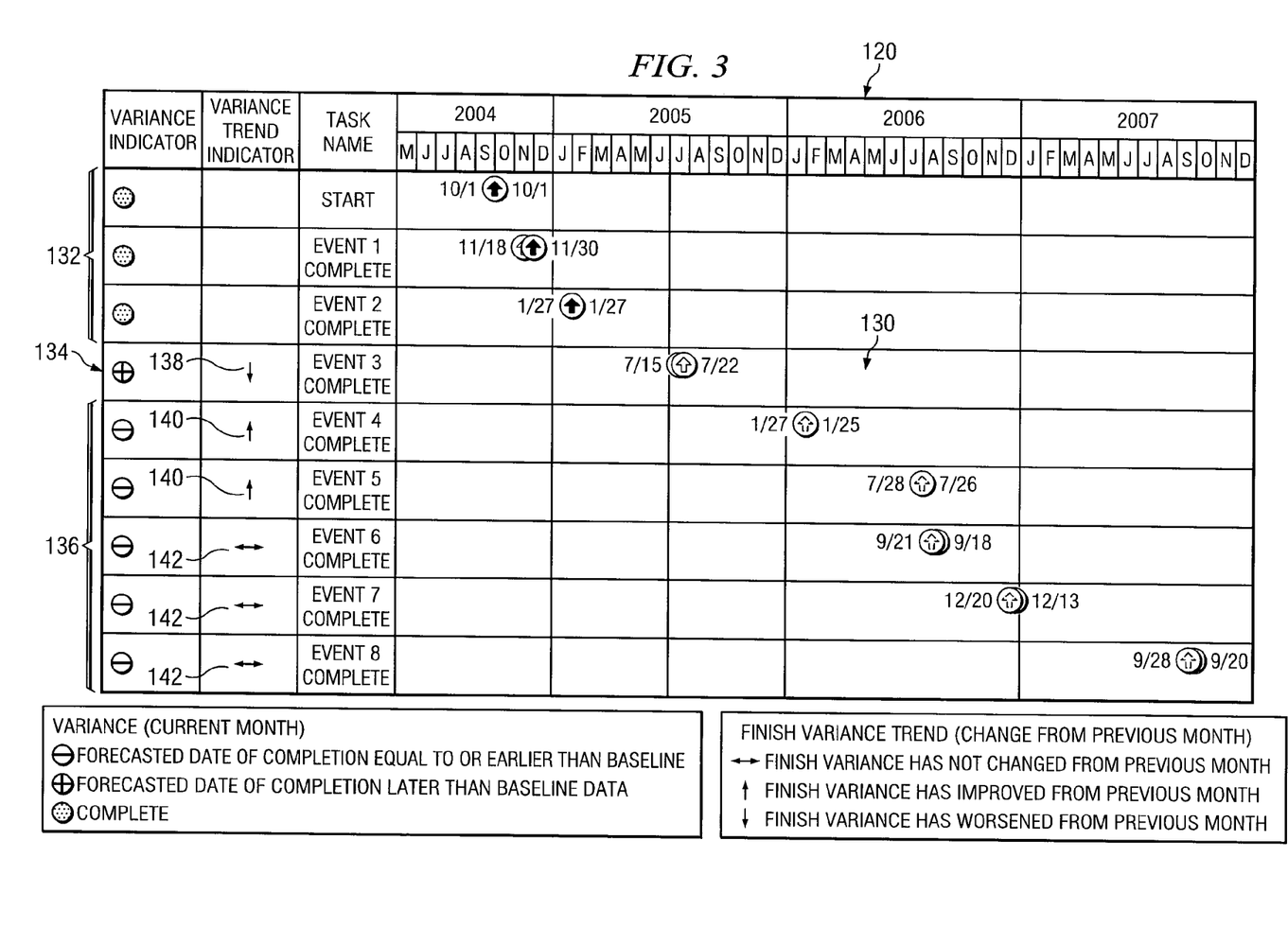
FIG. 3 is a chart describing milestones associated with project tasks, current variance indicators, and variance trend indicators in accordance with one embodiment of the invention.

FIG. 3 is a chart 120 describing milestones 130 associated with project tasks 122, current variance indicators 124, and variance trend indicators 126.

In one example, chart 120 or similar chart may be periodically generated to track progress of a project and to evaluate milestone predictions. User 18 may select the tasks to be used in chart 120 in one embodiment. Analyzer 28 may automatically compare baseline milestones to the updated milestones to determine variances. Analyzer 28 may also automatically compare the variances from one time period to another time period to calculate a variance trend. In other embodiments, display manager 26 may populate a chart similar to chart 120 with variances and variance trends.

Indicators may be graphical representations of variances, variance trends, and movement of milestones. In some embodiments, indicators may visually indicate whether a task is on track, behind schedule, or complete. For example, indicators representing updated and baseline milestones 130 are shown side by side to indicate the changes to milestones 130. In the illustrated example, the milestone associated with Task 3 moved forward 7 days indicating that Task 3 is 7 days behind schedule.

In other embodiments, a variance indicator may be coded, such as by symbols or colors, to indicate whether the variance is positive, negative, or zero. In the illustrated embodiment, solid dots 132 indicate that a project task is complete. Dots with a plus sign 134 indicate a positive variance where the updated time of completion is later than the baseline time. Dots with a minus sign 136 indicate a negative variance where the updated time of completion is equal to or earlier than the baseline planned time.

Indicators may also indicate variance trends. In the illustrated embodiment, directional arrows indicate variance trends. Down arrows 138 indicate that variances are worse this month than last month. Up arrows 140 indicate variances are better this month than last month. Double sideways arrows 142 indicate variances have not changed from the previous month.

The progress of project tasks may be tracked in some embodiments. For example, the total number of project tasks scheduled to occur during a time period may be determined. In another example, the total number of project tasks completed during a time period may be determined. In yet another example, the total number or project tasks started during a time period may be determined. Records manager 24 may retrieve the numbers of project tasks from database 20 or analyzer 28 may calculate the numbers of project tasks. Analyzer 28 may also analyze the numbers of project tasks. Display manager 26 generates the results for GUI 18 to communicate to user 18. In one example, display manager 26 generates the results of analyzing both milestones and tasks for GUI 18 to communicate to user 18.

Figure 4:
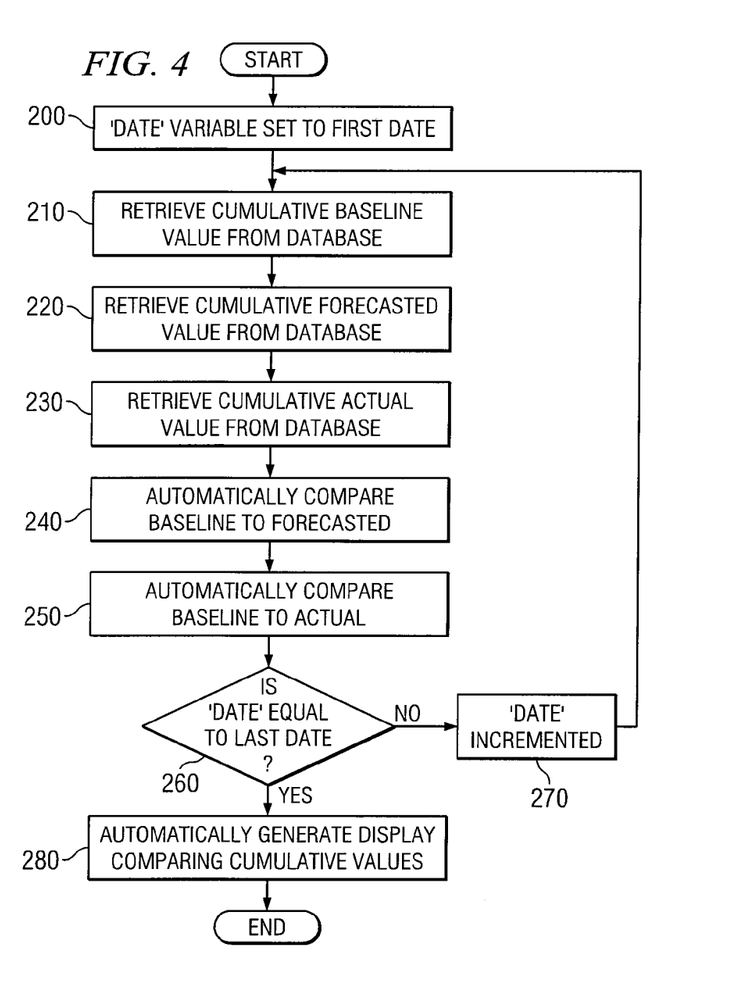
FIG. 4 is a flowchart describing a method for comparing cumulative baseline milestones with cumulative updated milestones and cumulative actual milestones in accordance with one embodiment of the invention.

FIG. 4 is a flowchart describing a method for comparing cumulative baseline milestones with cumulative updated milestones and cumulative actual milestones in accordance with one embodiment of the invention. Display manager 26 may automatically generate the results of the comparison for GUI 18 to communicate to user 18.

At step 200, the 'Time' variable is initially set to a first time. The time between the first time and 'Time' designates a time period. At step 210, the number of cumulative baseline milestones is retrieved from database 20. In this embodiment, the number of cumulative baseline milestones is the total number of baseline milestones predicted to occur between the time period. The number of cumulative baseline milestones may indicate the total number of tasks predicted at the beginning of the project to occur between the time period.

At step 220, a number of cumulative updated milestones is retrieved from database 20. The number of cumulative updated milestones may indicate the total number of tasks predicted after the beginning of the project to occur between the time period.

At step 230, a number of cumulative actual milestones is retrieved from database 20. In this embodiment, the number of cumulative actual milestones is the total number of tasks that are completed between the time period.

At step 240, the number of cumulative baseline milestones is automatically compared to the number of cumulative updated milestones. At step 250, the number of cumulative baseline milestones is automatically compared to the number of cumulative actual milestones.

At step 260, 'Time' is compared to project end time. If the time is not the project end time, then 'Time' is incremented at step 290 and steps 210-250 are repeated. If 'Time' is the project end time, display manager 26 automatically generates a display or printed report comparing the numbers of cumulative milestones. In some embodiments, the display may include charts, tabulated values, indicators, and/or other display representations. In one embodiment, the display may include the chart in FIG. 4.

In the illustrated embodiment, records manager 24 may retrieve the numbers of cumulative milestones from database 20 and communicate the numbers to analyzer 28 for analysis. In other embodiments, analyzer 28 or other module of system 10 may calculate the numbers of cumulative milestones. Analyzer 28 may calculate the number of cumulative actual milestones at 'Time' by summing the number of actual milestones occurring between first time and 'Time.' Analyzer 28 may calculate the number of cumulative baseline milestones at 'Time' by summing the number of baselines milestones predicted to occur between first time and 'Time.' Analyzer 28 may also calculate the number of cumulative updated milestones at 'Time' by summing the number of updated milestones predicted to occur between first time and 'Time.' In one embodiment, analyzer 28 may communicate the analyzed schedule data 14 to database 20 for storage.

In another embodiment, the cumulative baseline number of tasks may be compared with the cumulative updated number of tasks and the cumulative actual number of tasks. Records manager 24 may retrieve the numbers of cumulative number of tasks from database 20 and communicate the numbers to analyzer 28 for analysis. In other cases, analyzer 28 may calculate the numbers of cumulative number of tasks. Once analyzed, analyzer 28 may communicate the analyzed schedule data 14 to display manager 26. Display manager 26 may generate the results of the comparison for GUI 18 to communicate to user 18.

Modifications, additions, or omissions may be made to the method without departing from the scope of the invention. The method may include more, fewer, or other steps. Additionally, steps may be performed in any suitable order without departing from the scope of the invention.

Figure 5:
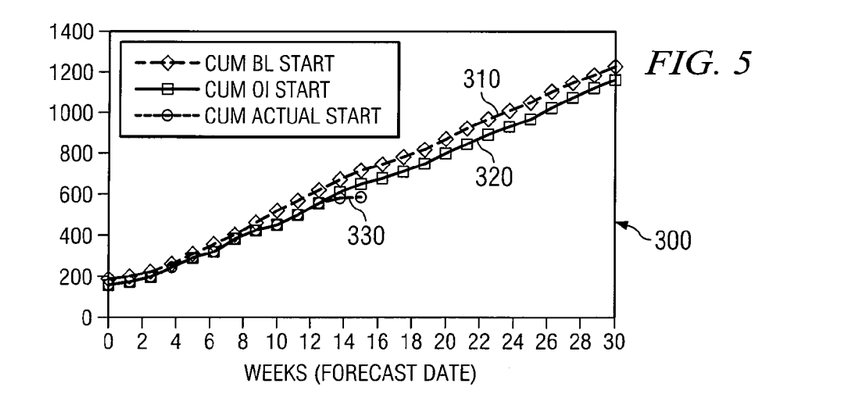
FIG. 5 is a chart showing trends in cumulative baseline, updated, and actual milestones in accordance with one embodiment of the invention.

FIG. 5 is a chart 300 illustrating trends in cumulative baseline, updated, and actual milestones in accordance with one embodiment of the invention. In this embodiment, each milestone represents the starting of a project task. A start may refer to the starting of a project task. Chart 300 includes a cumulative baseline milestone curve 310, a cumulative updated milestones curve 320, and a cumulative actual milestones curve 330.

In one embodiment, baseline milestones may be planned at the beginning of the project. After the beginning of the project, baseline milestones may be updated to create updated milestones. At week 12, user may request that schedule trend analysis tool 12 automatically generate chart 300. User 18 may use chart 300 to evaluate the progress of the project and/or evaluate the accuracy of the predicted milestones. Trend charts such as chart 300 may alert user 18 of scheduling inaccuracies and potential project delays. In response, user 18 may take actions. For example, user 18 may notice that the cumulative actual milestones are lower than cumulative updated milestones on chart 300. In response, user 18 may increase project resources to get the project back on schedule. Alternatively, new updated milestones may be created with new deadlines.

Cumulative baseline milestones curve 310 represents the total number of tasks that were planned to start by each week along timeline 340. Baseline milestones were predicted at the beginning of the project. Cumulative updated milestones curve 320 represents the updated total number of tasks predicted to start by a given week. Updated milestones were predicted at some time after the beginning of the project. Cumulative actual milestones curve 330 represents the total number of tasks that started by a given week.

According to the cumulative baseline milestones curve 310 and the cumulative updated milestones curve 320, the number of cumulative updated milestones is consistently lower than the number of cumulative updated milestones. This comparison may indicate that future baseline milestone predictions should be more conservative. From this evaluation, milestones may be planned more conservatively in the future. In addition, new updated milestones may be created that are closer to actual milestones.

In one embodiment, analyzer 28 may automatically calculate the number of milestones with deadlines occurring during a week, month, year, or other time period. In another embodiment, analyzer may automatically calculate the number of milestones associated with cancelled tasks.

In one embodiment, analyzer 28 may automatically calculate the number of milestones with deadlines that are late, on-time, or early and compare the results. For example, analyzer 28 may automatically calculate and compare the number of milestones with early starts, late starts, and on-time starts during a week. Display manager 26 may automatically generate a display showing the results. For example, display manager 26 may automatically generate a chart showing the number of deadlines delayed for each month during a time period.

Figure 6:
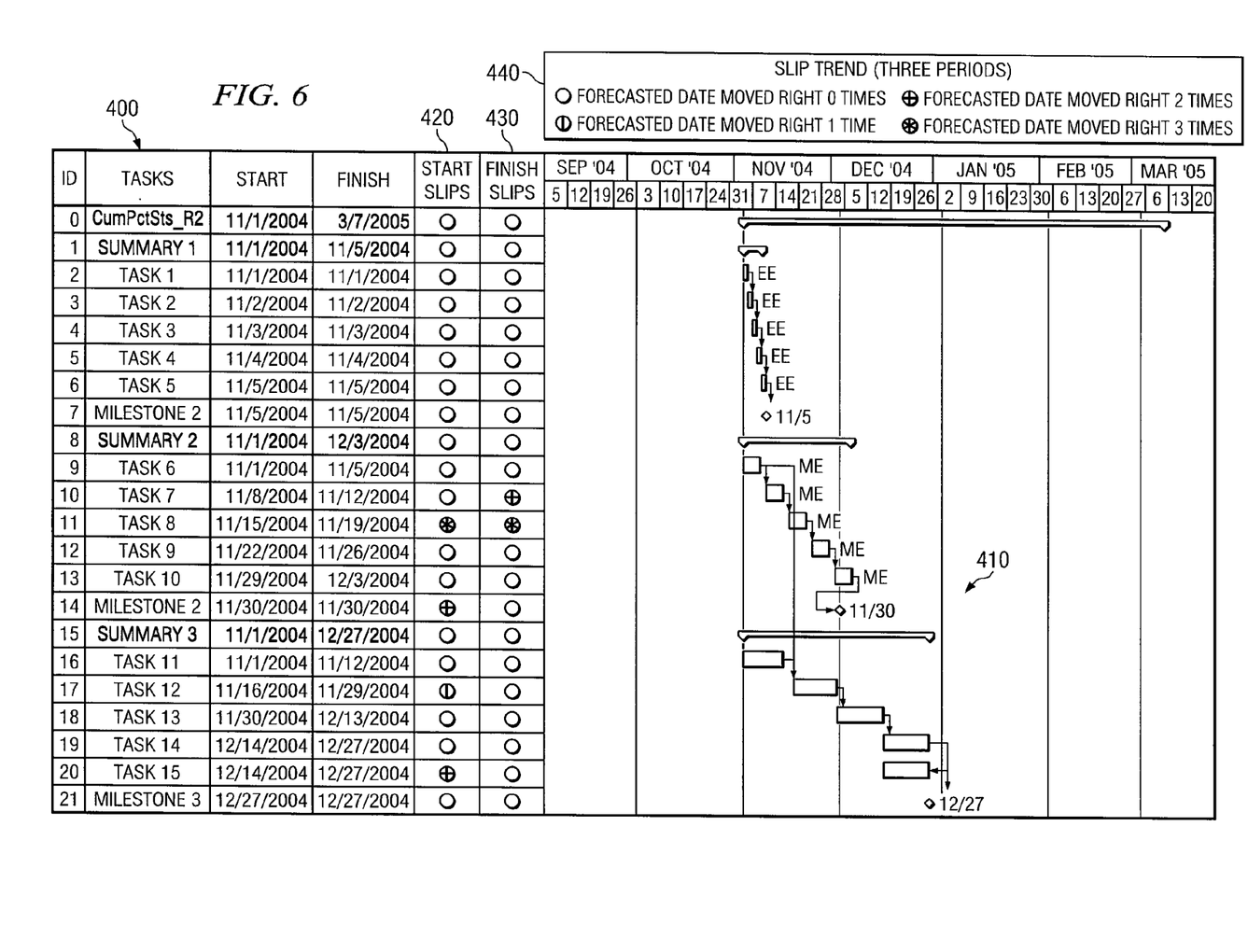
FIG. 6 is a chart showing a trend in slipped deadlines of project tasks in accordance with one embodiment of the invention.

FIG. 6 is a chart 400 showing a trend in slipped deadlines of project tasks in accordance with one embodiment of the invention. Chart 400 includes a series of tasks with associated milestones 410, start slips indicators 420, and finish slips indicators 440.

The deadline of a task may slip when the deadline of the updated milestone occurs after the deadline of the baseline milestone. A slipped deadline is the time between the deadline of the updated milestone and the deadline of the baseline milestone. A slip trend may refer to the trend in slipped deadlines of project tasks.

In one embodiment, milestones may represent the starting of tasks and the completion of tasks. A start slip may be a start time that slips and a finish slip may be an end time that slips. In some embodiments, slip trends may be used to determine the accuracy of the updated milestones and/or other milestones. Slip trends may be used to determine the accuracy of scheduled deadlines of projects tasks.

Analyzer 28 may automatically count the number of start slips 420 and finish slips 440 for each task of a series of tasks. Analyzer 28 may automatically generate chart 400 using the counted slips.

Slip trend indicators 440 may graphically indicate slip trends to user 18. Slip trend indicators 440 may indicate the number of times that the deadline slips. In the illustrated embodiment, slip trend indicators identify when the deadline moves to the right 0, 1, 2, and 3 times.

Display manager 26 may use any number of GUIs 16 to prompt user 18 to customize field definitions, trend metrics, and other input/output metrics. Field definitions may, in some embodiments, identify schedule data 14 retrieved from database 20. Trend metrics may be criteria used to: analyze trends in schedule data, generate displays of the analyzed trends, and/or filter schedule data retrieved from database 20.

Any number of GUIs 16 may be used to prompt user 18 to input field definitions and trend metrics. For example, user 18 may push a button in GUI 16 to activate schedule trend analysis tool 12. Once activated, analyzer 28 may retrieve and count schedule data, and automatically analyze schedule trends based on the field definitions and trend metrics. In one case, display manager 26 may automatically launch Microsoft Excel, populate an Excel spreadsheet with the trend data, generate a Microsoft graph, launch Microsoft PowerPoint, and export a display to Microsoft PowerPoint.

Figure 7:
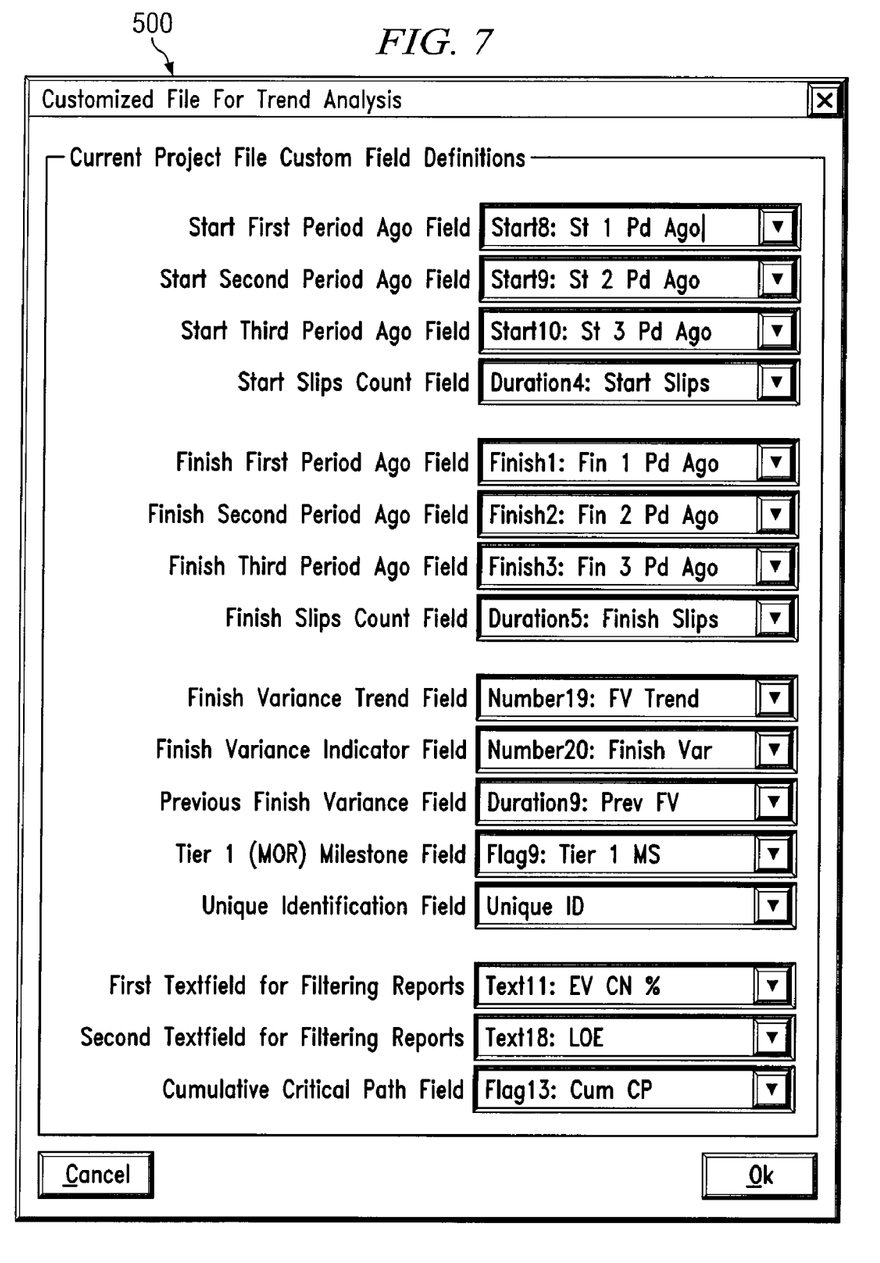
FIG. 7 one example of an interface that may be used to customize field definitions in accordance with embodiments of the invention.

FIG. 7 illustrates one example of a Microsoft Project interface 500 that may be used to customize field definitions in accordance with embodiments of the invention. In this embodiment, user 18 enters data in Microsoft Project interface 500 to customize the following field definitions:

Start first period ago field
Start second period ago field
Start third period ago field
Start slips count field
Finish first period ago field
Finish second period ago field
Finish slips count field
Finish variance trend field
Finish variance indicator field
Previous finish variance field
Tier 1 (MOR) milestone field
Unique identification field
First text field for Filtering reports
Second text field for filtering reports
Cumulative critical path field Field definitions may be used to define schedule data 14 retrieved from database 20 in one embodiment In another embodiment, field definitions may be used to analyze schedule data. In yet another embodiment, field definitions may be used to display schedule trend data.

Figure 8A:
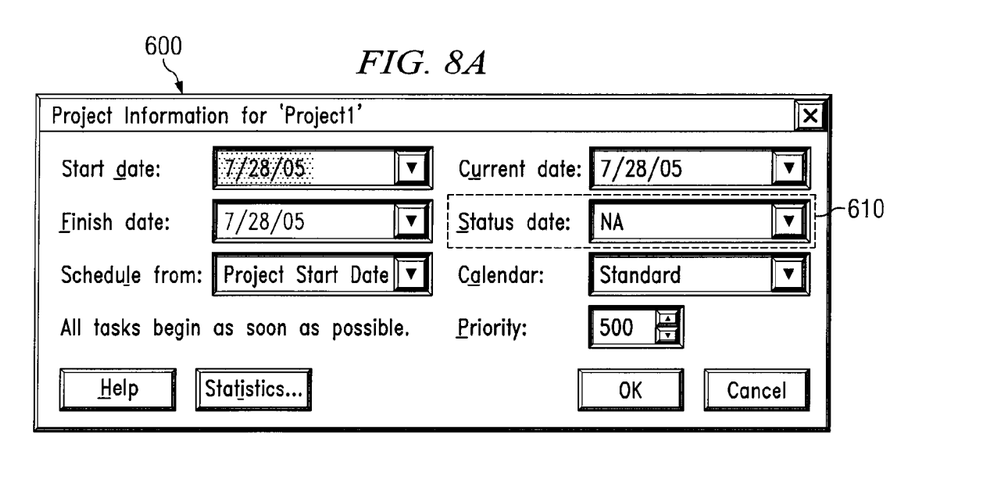
FIG. 8 illustrates user interfaces for customizing trend metrics in accordance with embodiments of the invention.
Figure 8B:
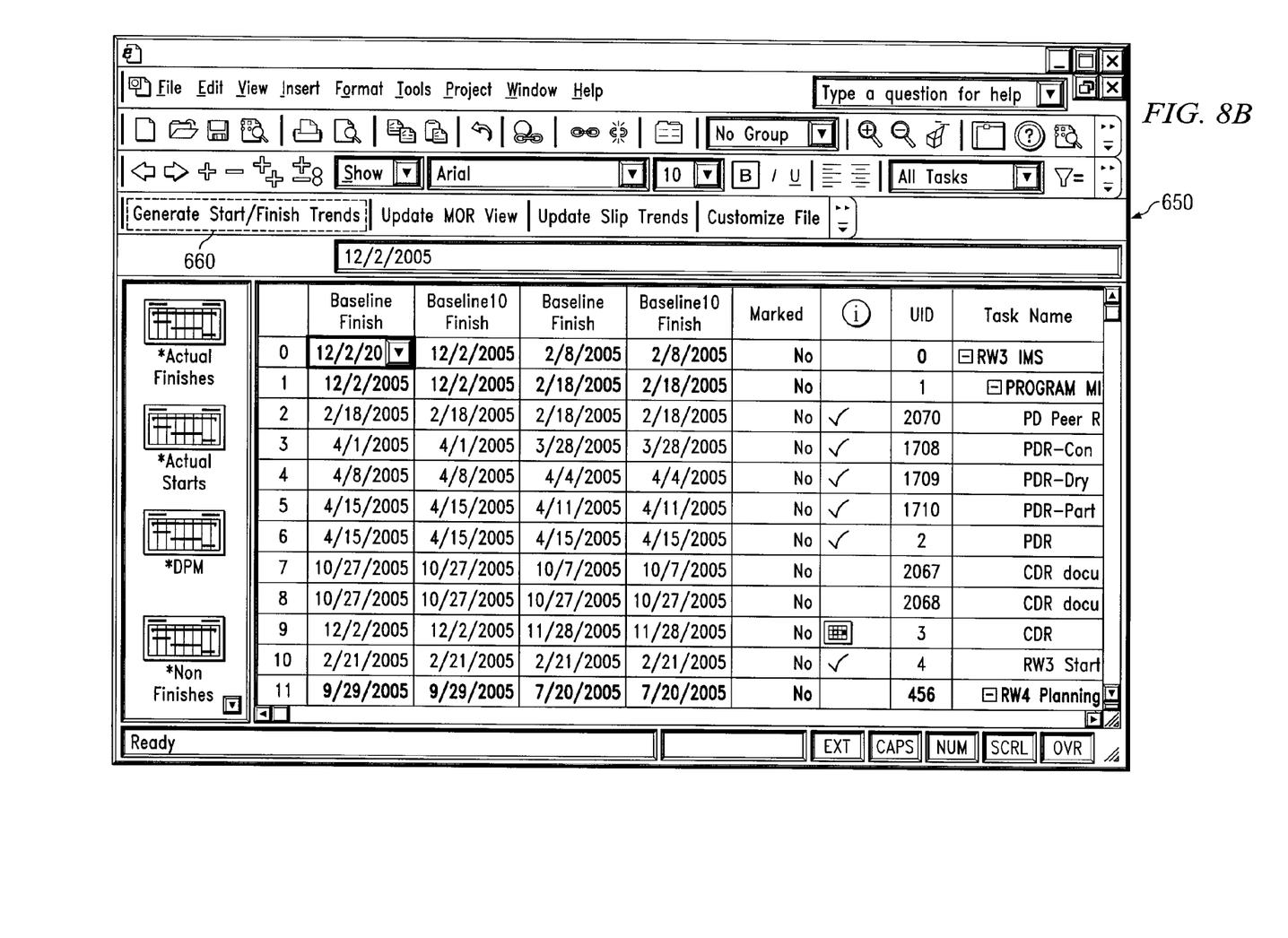

FIG. 8 illustrates user interfaces 600, 650 for customizing trend metrics in accordance with embodiments of the invention. In illustrated interface 600, user 18 may customize: start time, complete or finish time, schedule from, current time, status time, calendar, and priority. For example, user 18 may select the status time Microsoft Project toolbar 610 to customize the range of times used to generate trend charts.

User 18 may request that schedule trend analysis tool 12 automatically generate schedule trend charts by selecting buttons, keys, or other user interface option. In this illustrated example, user 18 may select button 660 to have a start/finish trends chart automatically generated.

Figure 9A:
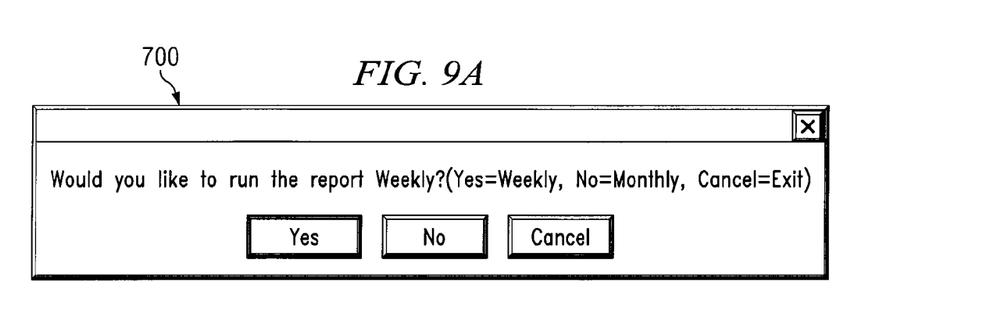
FIG. 9 illustrates user interfaces for filtering schedule data used in a schedule trend report in accordance with embodiments of the invention.
Figure 9B:
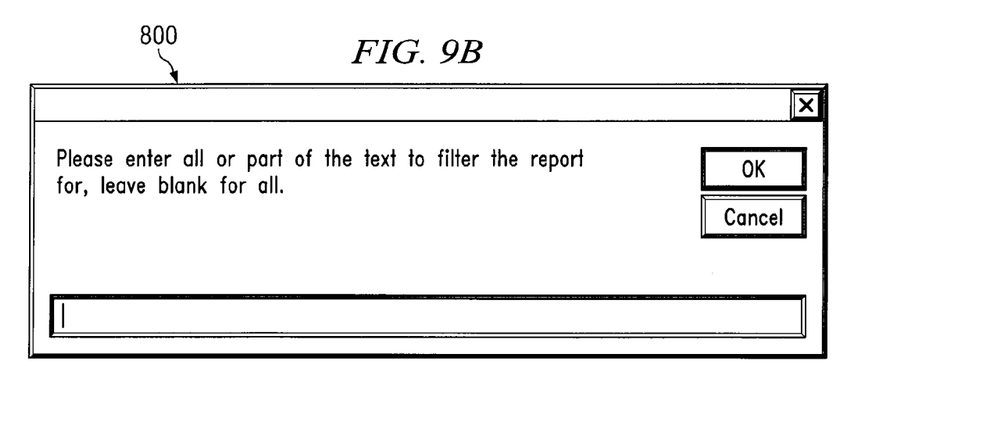

FIG. 9 includes user interfaces 700, 800 for filtering schedule data used in a schedule trend report in accordance with embodiments of the invention.

User 18 may choose a time period using user interface 700 in the illustrated embodiment. According to the illustrated embodiment, user 18 may select weekly or monthly time period by pushing buttons 'Yes,' 'No,' or 'Cancel' on interface 700. In one case, selecting 'Yes' may trigger records manager 24 to retrieve schedule data for a week. This selection may also trigger analyzer 28 to automatically analyze the retrieved schedule data for the week and trigger display manager 26 to automatically generate a display of the weekly trend data.

User 18 may use interface 800 to choose to have schedule data 14 filtered by text fields. User may enter text at user interface 800. Analyzer 28 may filter schedule data 14 using the entered text. Analyzer 28 may automatically analyze the filtered schedule data and display manager 26 may automatically generate a display of the analyzed filtered schedule data.

Prior systems manually create filters and macros to count the number of scheduled tasks that should have started and did not or should have finished and did not. This data is then entered by hand or copied electronically from Microsoft Project into Microsoft Excel. Once in Excel, graphs are manually created. These graphs are copied and pasted into another software such as Microsoft PowerPoint for presentation to management.

Certain embodiments of the invention may provide one or more technical advantages. A technical advantage of one embodiment may be the automated analysis of schedule trends. Another technical advantage of one embodiment may be the automated generation of multiple schedule trend charts. User 18 may use the trend analysis results to foresee and proactively mitigate potential scheduling problems. For example, trends showing slipped end times may forewarn the user 18 of potential delays in scheduled tasks. User 18 may also use the trends to improve future scheduling.

While this disclosure is described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for determining a variance trend in schedule data, comprising:
 retrieving schedule data from a database, the schedule data comprising:
  a task description of a task; and
  a plurality of milestones associated with the task, the milestones comprising a baseline milestone associated with a baseline deadline, a first updated milestone associated with a first updated deadline, and a second updated milestone associated with a second updated deadline;
 calculating, by a processor, a first variance by comparing the first updated deadline to the baseline deadline;
 calculating, by the processor, a second variance by comparing the second updated deadline to the baseline deadline, the first variance associated with a time prior to that of the second variance;
 automatically determining, by the processor, the variance trend in schedule data that indicates a change in variance by subtracting the second variance from the first variance, a positive variance trend indicating that the first and second updated deadlines are approaching the baseline deadline; and automatically generating a display representing the variance trend.

2. The method of claim 1, wherein the plurality of milestones further comprises an actual milestone associated with a completion time; and further comprising:

automatically determining a third variance by comparing the completion time to at least one of the first updated deadline, second updated deadline, and baseline deadline; and     automatically displaying a third indicator associated with the third variance.

3. The method of claim 1, wherein the display includes a trend indicator representative of the variance trend.

4. The method of claim 1, further comprising receiving from a user a request to determine the variance trend in schedule data.

5. A system for determining a variance trend in schedule data, comprising:

a records manager comprising a computer processor and operable to retrieve schedule data stored in a database, the schedule data comprising:

a task description of a task; and         a plurality of milestones associated with the task, the milestones comprising a baseline milestone associated with a baseline deadline, a first updated milestone associated with a first updated deadline, and a second updated milestone associated with a second updated deadline;

an analyzer comprising a computer processor and operable to:

calculate a first variance by comparing the first updated deadline to the baseline deadline;

calculate a second variance by comparing the second updated deadline to the baseline deadline, the first variance associated with a time prior to that of the second variance; and     automatically determine the variance trend in schedule data that indicates a change in variance by subtracting the second variance from the first variance, a positive variance trend indicating that the first and second updated deadlines are approaching the baseline deadline; and     a display manager operable to automatically generate a display representing the variance trend.

6. The system of claim 5, wherein:

the plurality of milestones further comprises an actual milestone associated with a completion time;

the analyzer is further operable to automatically determine a third variance by comparing the completion time to at least one of the first updated deadline, second updated deadline, and baseline deadline; and the display manager is further operable to automatically display a third indicator associated with the third variance.

7. The system of claim 5, wherein the display includes a trend indicator representative of the variance trend.

8. The system of claim 5, further comprising an interface operable to receive from a user a request to determine the variance trend in schedule data.

9. Logic for determining a variance trend in schedule data, the logic embodied in a non-transitory computer readable medium comprising code operable to:

retrieve schedule data from a database, the schedule data comprising:

a task description of a task; and         a plurality of milestones associated with the task, the milestones comprising a baseline milestone associated with a baseline deadline, a first updated milestone associated with a first updated deadline, and a second updated milestone associated with a second updated deadline; and     calculate a first variance by comparing the first updated deadline to the baseline deadline;

calculate a second variance by comparing the second updated deadline to the baseline deadline, the first variance associated with a time prior to that of the second variance;

automatically determine the variance trend in schedule data that indicates a change in variance by subtracting the second variance from the first variance, a positive variance trend indicating that the first and second updated deadlines are approaching the baseline deadline; and     automatically generate a display representing the variance trend.

10. The logic of claim 9, wherein the plurality of milestones further comprises an actual milestone associated with a completion time; and the code is further operable:

automatically determine a third variance by comparing the completion time to at least one of the first updated deadline, second updated deadline, and baseline deadline; and     automatically display a third indicator associated with the third variance.

11. The logic of claim 9, wherein the display includes a trend indicator representative of the variance trend.

12. The logic of claim 9, wherein the code is further operable to receive from a user a request to determine the variance trend in schedule data.

\* \* \* \* \*